(12) United States Patent
Wu et al.

(10) Patent No.: US 11,803,883 B2
(45) Date of Patent: Oct. 31, 2023

(54) QUALITY ASSURANCE FOR LABELED TRAINING DATA

(71) Applicant: NIELSEN CONSUMER LLC, New York, NY (US)

(72) Inventors: Ming-Kuang Daniel Wu, Woodside, CA (US); Chu-Cheng Hsieh, San Jose, CA (US)

(73) Assignee: NIELSEN CONSUMER LLC, Chicago, IL (US)

( * ) Notice: Subject to any disclaimer, the term of this patent is extended or adjusted under 35 U.S.C. 154(b) by 769 days.

(21) Appl. No.: 16/243,342

(22) Filed: Jan. 9, 2019

(65) Prior Publication Data

US 2019/0236478 A1   Aug. 1, 2019

Related U.S. Application Data

(60) Provisional application No. 62/623,448, filed on Jan. 29, 2018.

(51) Int. Cl.
*G06Q 30/0283* (2023.01)
*G06F 16/9535* (2019.01)
(Continued)

(52) U.S. Cl.
CPC ....... *G06Q 30/0283* (2013.01); *G06F 16/285* (2019.01); *G06F 16/9535* (2019.01);
(Continued)

(58) Field of Classification Search
CPC ........ G06N 20/00; G06N 5/02; G06K 9/6282; G06Q 30/0282; G06F 16/9535; G06F 16/285
See application file for complete search history.

(56) References Cited

U.S. PATENT DOCUMENTS 5,664,109 A   9/1997   Johnson et al.
5,864,848 A   1/1999   Horvitz et al.
(Continued)

FOREIGN PATENT DOCUMENTS

EP   1139264   10/2001
JP   2002014681   1/2002
(Continued)

OTHER PUBLICATIONS

Japan Patent Office, "Office Action," issued in connection with Japanese Patent Application No. 2019-013304, dated Mar. 3, 2023, 4 pages (English Translation Included).

*Primary Examiner* — Justin R. Blaufeld
(74) *Attorney, Agent, or Firm* — HANLEY, FLIGHT & ZIMMERMAN, LLC

(57) ABSTRACT

Methods, systems, apparatus, and tangible non-transitory carrier media encoded with one or more computer programs for classifying an item. In accordance with particular embodiments, a labeling task is issued to workers participating in a crowdsourcing system. The labeling task includes evaluating an inferred classification that includes one or more of the class labels in a hierarchical classification taxonomy based at least in part on a description of the item and the class labels in the classification. Evaluation decisions are received from the crowdsourcing system. The classification is validated based on the evaluation decisions to obtain a validation result. The validating includes applying at least one consensus criterion to an aggregation of the received evaluation decisions. Data corresponding to one or more of the class labels in the classification is routed to respective destinations based on the validation result.

26 Claims, 4 Drawing Sheets

(51) Int. Cl.
*G06F 16/28* (2019.01)
*G06N 5/02* (2023.01)
*G06Q 30/0282* (2023.01)
*G06Q 10/0631* (2023.01)
*G06Q 30/0201* (2023.01)
*G06Q 10/0639* (2023.01)
*G06Q 10/0633* (2023.01)
*G06F 18/243* (2023.01)

(52) U.S. Cl.
CPC ......... *G06F 18/24323* (2023.01); *G06N 5/02* (2013.01); *G06Q 10/0633* (2013.01); *G06Q 10/06398* (2013.01); *G06Q 10/063112* (2013.01); *G06Q 30/0201* (2013.01); *G06Q 30/0282* (2013.01)

(56) References Cited

U.S. PATENT DOCUMENTS

| | | |
|---|---|---|
| 5,897,622 A | 4/1999 | Blinn et al. |
| 6,772,130 B1 | 8/2004 | Karbowski et al. |
| 7,082,426 B2 | 7/2006 | Musgrove et al. |
| 7,197,449 B2 | 3/2007 | Hu |
| 7,321,887 B2 | 1/2008 | Dorner et al. |
| 7,546,290 B2 | 6/2009 | Colando |
| 7,627,641 B2 | 12/2009 | Aslop |
| 7,685,276 B2 * | 3/2010 | Konig .................. H04L 67/53 709/224 |
| 7,739,337 B1 | 6/2010 | Jensen |
| 7,747,693 B2 | 6/2010 | Banister |
| 7,783,515 B1 | 8/2010 | Kumar et al. |
| 7,788,262 B1 | 8/2010 | Shirwadkar |
| 7,809,824 B2 | 10/2010 | Wei et al. |
| 7,899,871 B1 | 3/2011 | Kumar |
| 7,917,548 B2 | 3/2011 | Gibson et al. |
| 8,046,797 B2 | 10/2011 | Bentolia et al. |
| 8,055,999 B2 | 11/2011 | Dames et al. |
| 8,078,619 B2 | 12/2011 | Bansal et al. |
| 8,095,597 B2 | 1/2012 | Rawat et al. |
| 8,230,323 B2 | 7/2012 | Bennett et al. |
| 8,233,751 B2 | 7/2012 | Patel et al. |
| 8,458,054 B1 | 6/2013 | Thakur |
| 8,489,689 B1 | 7/2013 | Sharma et al. |
| 8,527,436 B2 | 9/2013 | Salaka et al. |
| 8,560,621 B2 | 10/2013 | Rawat et al. |
| 8,666,812 B1 | 3/2014 | Gandhi |
| 8,676,815 B2 | 3/2014 | Deng |
| 8,738,477 B2 | 5/2014 | Lefebvre et al. |
| 8,744,948 B1 | 6/2014 | McVickar et al. |
| 8,812,417 B2 | 8/2014 | Martinez et al. |
| 8,819,109 B1 | 8/2014 | Krishnamurthy |
| 8,868,621 B2 | 10/2014 | D'Onofrio |
| 8,903,924 B2 | 12/2014 | Jensen et al. |
| 9,053,206 B2 | 6/2015 | Cai et al. |
| 9,268,860 B2 | 2/2016 | Lee et al. |
| 9,275,418 B2 | 3/2016 | Johansen et al. |
| 9,286,586 B2 | 3/2016 | Kern et al. |
| 9,305,263 B2 | 4/2016 | Horvitz et al. |
| 9,311,599 B1 | 4/2016 | Attenberg et al. |
| 9,313,166 B1 | 4/2016 | Zeng |
| 9,323,731 B1 | 4/2016 | Younes et al. |
| 9,436,738 B2 | 9/2016 | Ehsani et al. |
| 9,483,741 B2 * | 11/2016 | Sun ...................... G06F 18/254 |
| 9,508,054 B2 | 11/2016 | Brady |
| 9,734,169 B2 | 8/2017 | Redlich |
| 9,767,419 B2 | 9/2017 | Venanzi et al. |
| 9,792,530 B1 * | 10/2017 | Wu ...................... G06F 18/40 |
| 9,799,327 B1 | 10/2017 | Chan |
| 9,846,902 B2 | 12/2017 | Brady |
| 10,339,470 B1 * | 7/2019 | Dutta ...................... G06N 20/20 |
| 2001/0016819 A1 | 8/2001 | Kolls |
| 2002/0046248 A1 | 4/2002 | Drexler |
| 2002/0052847 A1 | 5/2002 | Shioda et al. |
| 2002/0065884 A1 | 5/2002 | Donoho et al. |
| 2002/0091776 A1 | 7/2002 | Nolan et al. |
| 2002/0143937 A1 | 10/2002 | Revashetti et al. |
| 2002/0156817 A1 | 10/2002 | Lemus |
| 2002/0174185 A1 | 11/2002 | Rawat et al. |
| 2003/0105681 A1 | 6/2003 | Oddo |
| 2004/0044587 A1 | 3/2004 | Schwartzman |
| 2004/0044674 A1 | 3/2004 | Mohammadioun et al. |
| 2004/0064373 A1 | 4/2004 | Shannon |
| 2004/0117615 A1 | 6/2004 | Wilks |
| 2004/0177120 A1 | 9/2004 | Kirsch |
| 2004/0199595 A1 | 10/2004 | Banister et al. |
| 2004/0205737 A1 | 10/2004 | Margaliot et al. |
| 2004/0220926 A1 | 11/2004 | Lamkin et al. |
| 2004/0230647 A1 | 11/2004 | Rawat et al. |
| 2005/0050099 A1 | 3/2005 | Bleistein et al. |
| 2005/0055290 A1 | 3/2005 | Bross et al. |
| 2005/0131764 A1 | 6/2005 | Pearson et al. |
| 2005/0177785 A1 | 8/2005 | Shrader |
| 2005/0184152 A1 | 8/2005 | Bornitz |
| 2005/0210016 A1 | 9/2005 | Brunecky |
| 2005/0246269 A1 | 11/2005 | Smith |
| 2006/0026152 A1 | 2/2006 | Zeng et al. |
| 2006/0088214 A1 | 4/2006 | Handley et al. |
| 2006/0122899 A1 | 6/2006 | Lee et al. |
| 2006/0143158 A1 | 6/2006 | Ruhl et al. |
| 2006/0206063 A1 | 9/2006 | Cao |
| 2006/0206306 A1 | 9/2006 | Cao et al. |
| 2006/0265396 A1 | 11/2006 | Raman et al. |
| 2006/0282442 A1 | 12/2006 | Lennon et al. |
| 2006/0288268 A1 | 12/2006 | Srinivasan et al. |
| 2007/0069013 A1 | 3/2007 | Seifert et al. |
| 2007/0073580 A1 * | 3/2007 | Perry ...................... G06Q 30/02 705/26.1 |
| 2007/0073592 A1 | 3/2007 | Perry et al. |
| 2007/0156732 A1 | 7/2007 | Surendran et al. |
| 2007/0168464 A1 | 7/2007 | Noonan |
| 2007/0185865 A1 | 8/2007 | Budzik et al. |
| 2007/0198727 A1 | 8/2007 | Guan |
| 2007/0250390 A1 | 10/2007 | Lee et al. |
| 2007/0294127 A1 | 12/2007 | Zivov |
| 2008/0033831 A1 | 2/2008 | Boss et al. |
| 2008/0072140 A1 | 3/2008 | Vydiswaran |
| 2008/0073429 A1 | 3/2008 | Oesterling et al. |
| 2008/0098300 A1 | 4/2008 | Corrales et al. |
| 2008/0147525 A1 | 6/2008 | Allen et al. |
| 2008/0228466 A1 | 9/2008 | Sudhakar |
| 2008/0262940 A1 | 10/2008 | Kovach |
| 2008/0288486 A1 | 11/2008 | Kim et al. |
| 2008/0306831 A1 | 12/2008 | Abraham |
| 2008/0306968 A1 | 12/2008 | Nandhra |
| 2008/0307046 A1 | 12/2008 | Baek et al. |
| 2009/0089209 A1 | 4/2009 | Bixler et al. |
| 2009/0171906 A1 | 7/2009 | Adams et al. |
| 2009/0204545 A1 | 8/2009 | Barsukov |
| 2009/0299887 A1 | 12/2009 | Shiran |
| 2009/0300482 A1 | 12/2009 | Summers et al. |
| 2009/0313101 A1 | 12/2009 | McKenna et al. |
| 2009/0313132 A1 | 12/2009 | McKenna et al. |
| 2009/0327268 A1 | 12/2009 | Denney et al. |
| 2010/0037177 A1 | 2/2010 | Golsorkhi |
| 2010/0082754 A1 | 4/2010 | Bryan |
| 2010/0083095 A1 | 4/2010 | Nikovski et al. |
| 2010/0121775 A1 | 5/2010 | Keener |
| 2010/0161527 A1 | 6/2010 | Sellamanickam et al. |
| 2010/0257066 A1 | 10/2010 | Jones et al. |
| 2011/0078724 A1 | 3/2011 | Mehta et al. |
| 2011/0191206 A1 | 8/2011 | Kiarostami |
| 2011/0191693 A1 | 8/2011 | Baggett et al. |
| 2011/0208787 A1 | 8/2011 | Sidy |
| 2011/0246239 A1 | 10/2011 | Vdovjak et al. |
| 2011/0282734 A1 | 11/2011 | Zurada |
| 2011/0282906 A1 * | 11/2011 | Wong .................. G06F 16/7867 707/780 |
| 2012/0029963 A1 | 2/2012 | Olding et al. |
| 2012/0047014 A1 | 2/2012 | Smadja et al. |
| 2012/0059859 A1 | 3/2012 | Jiao et al. |
| 2012/0089903 A1 | 4/2012 | Liu et al. |
| 2012/0191585 A1 | 7/2012 | Lefebvre et al. |
| 2012/0203632 A1 | 8/2012 | Blum et al. |

(56) References Cited

U.S. PATENT DOCUMENTS

| | | |
|---|---|---|
| 2012/0203733 A1 | 8/2012 | Zhang |
| 2012/0239650 A1 | 9/2012 | Kim et al. |
| 2012/0259882 A1 | 10/2012 | Thakur et al. |
| 2012/0284081 A1 | 11/2012 | Cheng et al. |
| 2012/0284150 A1 | 11/2012 | Stanley |
| 2012/0290609 A1 | 11/2012 | Britt |
| 2012/0303411 A1 | 11/2012 | Chen |
| 2012/0303758 A1 | 11/2012 | Anbarasan et al. |
| 2012/0330971 A1 | 12/2012 | Thomas et al. |
| 2013/0009774 A1 | 1/2013 | Sabeta |
| 2013/0024282 A1 | 1/2013 | Kansal |
| 2013/0024525 A1 | 1/2013 | Brady et al. |
| 2013/0024924 A1 | 1/2013 | Brady et al. |
| 2013/0124376 A1 | 5/2013 | Lefebvre et al. |
| 2013/0145255 A1 | 6/2013 | Zheng et al. |
| 2013/0151631 A1 | 6/2013 | Jensen et al. |
| 2013/0191723 A1 | 7/2013 | Pappas et al. |
| 2013/0197954 A1* | 8/2013 | Yankelevich .......... G06Q 30/02 705/7.13 |
| 2013/0231969 A1 | 9/2013 | Pelt et al. |
| 2013/0228839 A1 | 10/2013 | Lefebvre et al. |
| 2013/0339145 A1 | 12/2013 | Blum et al. |
| 2014/0067633 A1 | 3/2014 | Venkatasubramanian et al. |
| 2014/0105508 A1 | 4/2014 | Arora |
| 2014/0172767 A1 | 6/2014 | Chen et al. |
| 2014/0188787 A1* | 7/2014 | Balamurugan .... G06Q 30/0629 707/609 |
| 2014/0189808 A1 | 7/2014 | Mahaffey et al. |
| 2014/0201126 A1 | 7/2014 | Zadeh |
| 2014/0229160 A1 | 8/2014 | Galle |
| 2014/0236577 A1 | 8/2014 | Malon et al. |
| 2014/0272884 A1* | 9/2014 | Allen .................. G09B 7/04 434/322 |
| 2014/0314311 A1* | 10/2014 | Garera ............... G06F 16/9537 382/159 |
| 2014/0358814 A1 | 12/2014 | Brady et al. |
| 2015/0086072 A1* | 3/2015 | Kompalli ............ G06V 40/161 382/103 |
| 2015/0095017 A1 | 4/2015 | Mnih et al. |
| 2015/0169522 A1 | 6/2015 | Logan et al. |
| 2015/0235166 A1 | 8/2015 | Brady et al. |
| 2015/0235301 A1 | 8/2015 | Brady et al. |
| 2015/0254593 A1* | 9/2015 | Ramos Rinze .. G06Q 10/06311 705/7.13 |
| 2015/0295869 A1 | 10/2015 | Li et al. |
| 2015/0363741 A1* | 12/2015 | Chandra .......... G06Q 10/06311 705/7.17 |
| 2016/0071048 A1* | 3/2016 | Gujar ............. G06Q 10/063112 705/7.14 |
| 2016/0104188 A1 | 4/2016 | Glyman et al. |
| 2016/0110762 A1 | 4/2016 | Mastierov et al. |
| 2016/0110763 A1 | 4/2016 | Mastierov et al. |
| 2016/0117316 A1 | 4/2016 | Le et al. |
| 2016/0180215 A1 | 6/2016 | Vinyals |
| 2016/0232440 A1 | 8/2016 | Gregor et al. |
| 2016/0232474 A1* | 8/2016 | Zou ..................... G06Q 50/01 |
| 2016/0247061 A1 | 8/2016 | Trask et al. |
| 2017/0011289 A1 | 1/2017 | Gao et al. |
| 2017/0017635 A1 | 1/2017 | Leliwa et al. |
| 2017/0032035 A1 | 2/2017 | Gao et al. |
| 2017/0076196 A1 | 3/2017 | Sainath et al. |
| 2017/0140753 A1 | 5/2017 | Jaitly et al. |
| 2017/0154258 A1 | 6/2017 | Liu et al. |
| 2017/0154295 A1 | 6/2017 | Fang |
| 2017/0192956 A1 | 7/2017 | Kaiser et al. |
| 2017/0200076 A1 | 7/2017 | Vinyals et al. |
| 2017/0235848 A1 | 8/2017 | Dusen et al. |
| 2017/0270100 A1 | 9/2017 | Audhkhasi et al. |
| 2017/0270409 A1 | 9/2017 | Trischler et al. |
| 2019/0197483 A1* | 6/2019 | Li ..................... G06Q 10/1053 |
| 2019/0236478 A1* | 8/2019 | Wu ................... G06Q 30/0201 |
| 2020/0326832 A1* | 10/2020 | Lee .................... H04L 67/10 |

FOREIGN PATENT DOCUMENTS

| | | |
|---|---|---|
| JP | 2014509002 | 4/2014 |
| JP | 2017505964 | 2/2017 |
| KR | 20140138512 | 12/2014 |
| WO | 200137540 | 5/2001 |
| WO | 2016064679 | 4/2016 |
| WO | 2017083752 | 5/2017 |
| WO | 2017090051 | 6/2017 |

\* cited by examiner

QUALITY ASSURANCE FOR LABELED TRAINING DATA

BACKGROUND

Hierarchical classification involves mapping input data into a taxonomic hierarchy of output classes. Many hierarchical classification approaches have been proposed. Examples include "flat" approaches, such as the one-against-one and the one-against-all schemes, which ignore the hierarchical structure and, instead, treat hierarchical classification as a multiclass classification problem that involves learning a binary classifier for all non-root nodes. Another approach is the "local" classification approach, which involves training a multiclass classifier locally at each node, each parent node, or each level in the hierarchy. A fourth common approach is the "global" classification approach, which involves training a global classifier to assign each item to one or more classes in the hierarchy by considering the entire class hierarchy at the same time.

Many automated classification approaches rely on machine learning based classifiers that have been trained to perform specific classification tasks. The accuracy of such classifiers, however, depends on having sufficient labeled data to train reliable classification models. The ability to collect high-quality and stable training data (i.e. the inferred truth) is essential for powering many supervised algorithms. These algorithms are often the foundation for modern business solutions, such as search engine rankings, image recognition, news categorization, and so on.

Hand-annotated training data have been the basis of many machine learning research. In recent years, crowdsourcing has become a common practice for generating training data, empowering researchers to outsource their tedious and labor-intensive labeling tasks to workers of crowdsourcing platforms. Crowdsourcing platforms provide large and inexpensive workforces for improved cost control and scalability. However, the unstable quality of the work produced by crowdsourcing platform workers is the main concern for crowdsourcing adopters.

Recent research shows that the best truth inference algorithm is very domain-specific, and no single algorithm outperforms others in most scenarios. Sometimes an intuitive approach like an Expectation-Maximization algorithm could be a practical solution. In the literature, research advances focus on handling task difficulty, worker bias, and worker variance. Specifically, task difficulty describes the degree of ambiguity of a question for which an annotated answer is sought; whereas worker bias and worker variance model the quality of workers to determine how likely a worker gives a wrong answer, assuming all tasks have equal difficulty.

Even though research has unveiled the challenges of crowdsourcing labeling tasks, it is undeniable that cost-effectiveness and scalability make crowdsourcing an attractive approach to generate training data.

SUMMARY

This specification describes systems implemented by one or more computers executing one or more computer programs that can classify an item according to a taxonomic hierarchy using one or more machine learning based classifiers and one or more crowdsourcing platforms.

Embodiments of the subject matter described herein include methods, systems, apparatus, and tangible non-transitory carrier media encoded with one or more computer programs for labeling items.

In accordance with particular embodiments, an item record that includes a description of an item is received. Based on one or more machine learning based classifiers, a classification in a hierarchical classification taxonomy is inferred for the item. The hierarchical classification taxonomy includes successive levels of nodes associated with respective class labels and the classification includes an ordered sequence of one or more of the class labels in the hierarchical classification taxonomy. A labeling task is issued over a communications network to a plurality of workers participating in a crowdsourcing system. The labeling task includes evaluating the classification based at least in part on the description of the item and the one or more class labels in the classification. Evaluation decisions are received from the crowdsourcing system. The classification is validated to obtain a validation result, where the validating includes applying at least one consensus criterion to an aggregation of the received evaluation decisions. Data corresponding to the one or more class labels in the classification is routed over a communications network to respective destinations based on the validation result.

Particular embodiments of the subject matter described herein include a computer-readable data storage apparatus comprising a memory component storing executable instructions that are operable to be executed by a processor. In accordance with particular embodiments, the memory component includes executable instructions to infer for the item a classification in a hierarchical classification taxonomy comprising successive levels of nodes associated with respective class labels based on one or more machine learning based classifiers, where the classification includes an ordered sequence of one or more of the class labels in the hierarchical classification taxonomy. The memory component further includes executable instructions to issue, over a communications network, a labeling task to a plurality of workers participating in a crowdsourcing system, where the labeling task includes evaluating the classification based at least in part on the description of the item and the one or more class labels in the classification. The memory component further includes executable instructions to receive evaluation decisions regarding the labeling task from the crowdsourcing system. The memory component further includes executable instructions to validate the classification to obtain a validation result, where the executable instructions to validate comprise executable instructions to apply at least one consensus criterion to an aggregation of the received evaluation decisions. The memory component further includes executable instructions to route, over a communications network, data corresponding to the one or more class labels in the classification to respective destinations based on the validation result.

In accordance with particular embodiments, a system includes a communication interface and a processor. The communication interface is arranged to: issue, over a communications network, a labeling task to a plurality of workers participating in a crowdsourcing system, where the labeling task includes evaluating an inferred classification that includes an ordered sequence of one or more class labels in successive levels of a hierarchical classification taxonomy based at least in part on a description of the item and the one or more class labels in the classification. Respective evaluation decisions are received from the crowdsourcing system. The processor is arranged to: validate the classification to obtain a validation result, where the validating comprises applying at least one consensus criterion to an aggregation of the received evaluation decisions; and routing, over a communications network, data corresponding to the one or more class labels in the classification to respective destinations based on the validation result.

Other features, aspects, objects, and advantages of the subject matter described in this specification will become apparent from the description, the drawings, and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The specification describes examples of an effective end-to-end multi-leveled hybrid solution for improving the quality of labeled training data obtained from one or more crowdsourcing platforms. These examples are described in the context of a machine learning based hierarchical classification system that is trained to classify items into a hierarchical classification taxonomy based on labeled training data.

Figure 1:
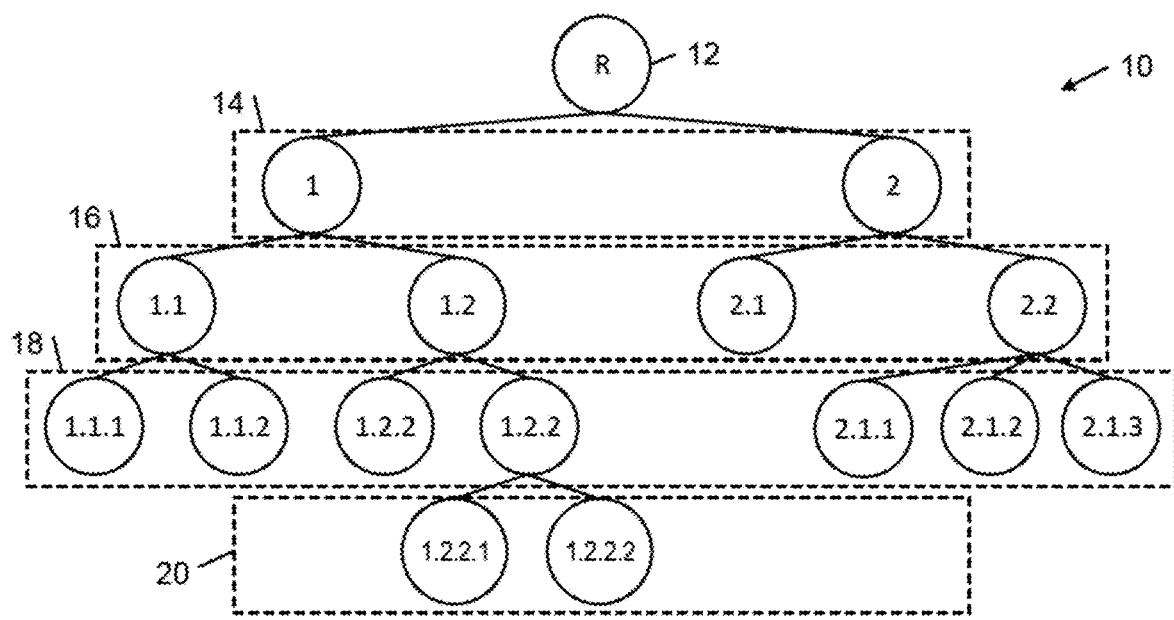
FIG. 1 is a diagrammatic view of an example taxonomic hierarchy of nodes corresponding to a tree.

FIG. 1 shows an example taxonomic hierarchy 10 arranged as a tree structure that has one root node 12 and a plurality of non-root nodes, where each non-root node is connected by a directed edge from exactly one other node. Terminal non-root nodes are referred to as leaf nodes (or leaves) and the remaining non-root nodes are referred to as internal nodes. The tree structure is organized into levels 14, 16, 18, and 20 according to the depth of the non-root nodes from the root node 12, where nodes at the same depth are in the same level in the taxonomic hierarchy. Each non-root node represents a respective class in the taxonomic hierarchy. In other examples, a taxonomic hierarchy may be arranged as a directed acyclic graph. In general, the taxonomic hierarchy 10 can be used to classify many different types of data items into different taxonomic classes.

In some examples, each data item is classified along a respective path through one or more levels of the taxonomic hierarchy 10. In some of these examples, an item is classified along a path that includes one respective node from each level in the hierarchy from one or more high-level broad classes, through zero or more progressively narrower classes, down to the leaf node level classes. In other examples, an item is classified along multiple paths through the taxonomic hierarchy 10. In some examples, an item is classified along a partial path or segment of nodes traversing different levels in the taxonomic hierarchy 10. In some of these examples, the path information improves classification performance.

In other examples, a data item is classified at each level in a taxonomic hierarchy 10 independently of the other levels by a respective classifier (e.g., a machine learning classifier, such as a neural network based classifier for learning word embeddings and text classification). In some of these examples, each machine learning model is trained on a respective set of training data (e.g., item description data) that is relevant to the respective level in the taxonomic hierarchy 10.

The system is designed to acquire high quality labeled training data through quality control strategies that dynamically and cost-effectively leverage the strengths of both crowdsourced workers and domain experts. In this way, machine learning models are trained on a combination of crowdsourced and expert labels.

In a first operational stage, cost-effective truth inference is collected from crowdsourcing workers in a way that is designed to reduce the likelihood of receiving answers that potentially have high bias and variance. In some examples, instead of asking crowdsourcing workers to evaluate item descriptions against a single node in a taxonomic hierarchy (e.g., a leaf node corresponding to an item type), embodiments of the solution ask workers to evaluate complete or partial classification paths through successive levels in the taxonomic hierarchy. This approach increases the classification context for evaluating the item description (and potentially other data associated with the item) and, thereby, increases the likelihood of receiving high-quality and stable training data without increasing crowdsourcing costs.

In a second operational stage, when consensus in an aggregation of workers' answers for a particular task is not reached, the task is passed to one or more trained domain experts who are expected to perform labeling tasks with low worker bias and worker variance due to the training and financial incentives they receive. The trained experts are intimately familiar with the item classifications in the taxonomic hierarchy as well as the guidelines for assigning the most appropriate item category label to any given product item. In some examples, domain experts are instructed to mark high-difficulty tasks as "unsolvable" to circumvent ambiguous cases.

In some examples, collaboration between the well-trained domain experts and the crowdsourcing workers is facilitated by an automated integrated data labeling engine (IDLE) to deliver high-quality hand-annotated training data. The IDLE framework streamlines a workflow for generating high quality training data by automating the process of filtering labeled data (by crowdsourcing) and the process of relabeling filtered data (by in house domain experts). It also provides an integrated environment for managing training data generation tasks as well as for assessing the quality of classification results that are generated by the IDLE system.

Figure 2:
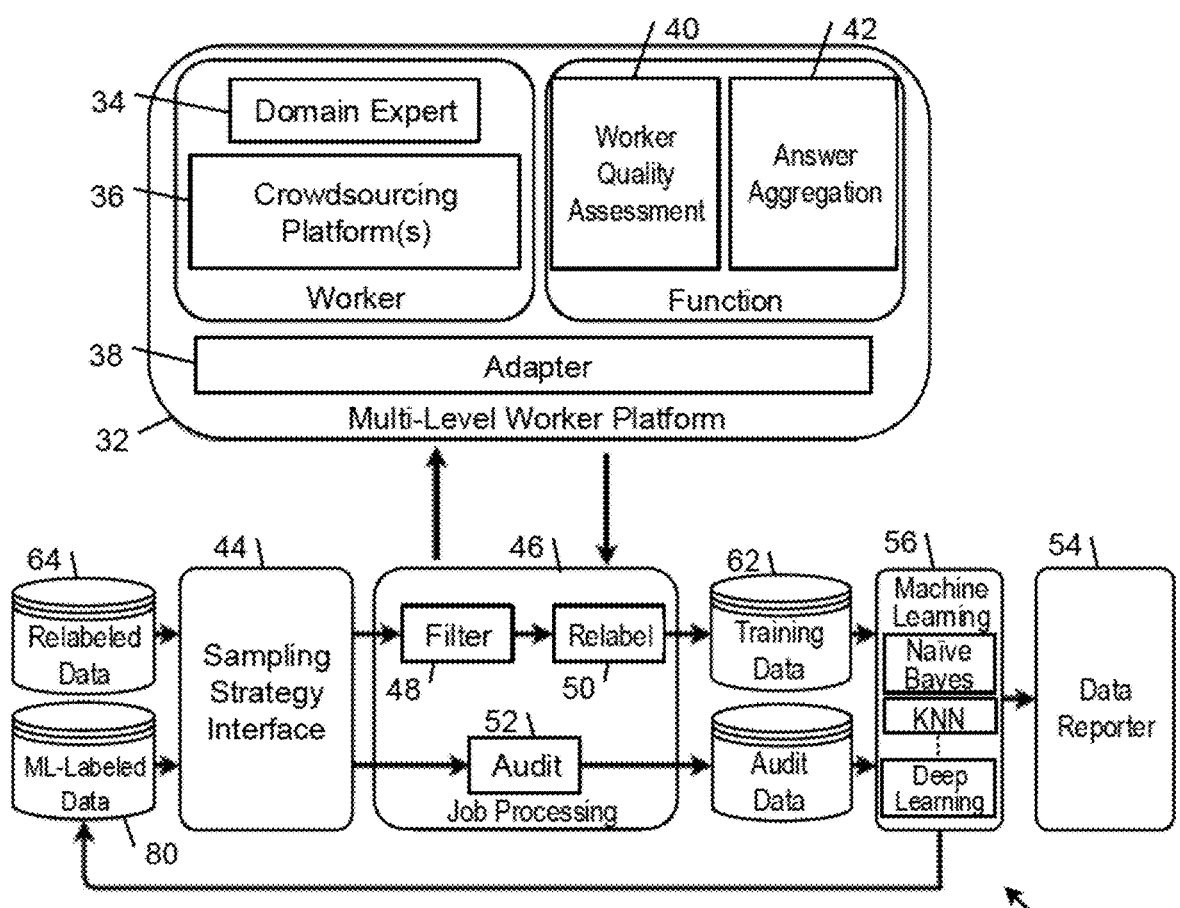
FIG. 2 is a block diagram of an example of an integrated data labeling system.

FIG. 2 shows an example of the IDLE system architecture 30. There are four main components in the data labeling framework: (1) a multi-level worker platform 32 that assigns tasks to domain experts 34 and one or more crowdsourcing platforms 36 through adapters 38, and also performs worker quality assessment 40 and answer aggregation 42; (2) a sampling strategy interface 44 with a unified user interface that enables a job requester to choose among various sampling strategies; (3) a job processing interface 46 that enables a job requester to launch jobs of various types (e.g., filter jobs 48, re-label jobs 50, and audit jobs 52); and (4) a data reporter dashboard 54 that shows the aggregated results from crowdsourcing and the improvement of the machine learning model 56.

The multi-level worker platform 32 has a unified interface that enables the job requester to submit a job through one or more adapters to various crowdsourcing platforms, such as MTurk and Crowdflower. Furthermore, the job requester can assign difficult labeling jobs to domain experts who sign into their IDLE system account to label data. The multi-level worker platform 32 also includes a uniform function interface for common features, such as worker exclusion and answer aggregation, across various crowdsourcing platforms 36.

The one or more adapters 38 provide respective interfaces through which a job requester can connect to a application programming interface (e.g., MTurk API) of a supported crowdsourcing platform to (1) launch a job, (2) stop a job, and (3) retrieve results. Adapters enable easy integration with different crowdsourcing platforms without making significant changes to the user experience or the rest of the IDLE system 30.

Answers returned by crowdsourcing workers are not always consistent and worker quality varies (e.g., master workers vs. non-master workers in MTurk). To address these challenges, the answer aggregation component 42 aggregates the responses received from the workers for a particular task to improve the ability to infer ground truth from the returned answers. In some examples, one or more of the following algorithms are used to aggregate task responses and assess consensus: majority voting, weighted majority voting, and Bayesian voting. In addition, an answer aggregation interface is provided to enable developers of the IDLE system 30 to easily implement customized answer aggregation algorithms. In some examples, a job requester can specify consensus rules in the form of [#answer, #yes] for determining the final answer. In some examples, a rule template defines a consensus criterion in terms of #yes/#answer level of consensus in total #answer number of answers. More elaborate answer aggregation strategies may be expressed through a sequence of consensus rules. For instance, a consensus criteria rule [3, 3] followed by rule [4, 3] collectively instruct the system to first seek unanimous consensus among 3 answers ([3, 3]) and, for questions whose answers fail to meet the first consensus criterion, the system solicits an additional answer (#answer=3+1) according to the second [4, 3] consensus criterion. In some examples, more than two consecutive consensus criteria are applied to the workers' evaluation decisions received for the crowdsourcing job.

The worker quality assessment component 40 is configured to assess worker quality. Worker's quality varies widely on crowdsourcing platforms. The fact that this quality is unknown in advance makes it even more important to assess worker's quality. Examples of the IDLE system 30 are configured to randomly select questions from a curated pool of questions with ground truth answers (called 'golden tasks') to estimate worker's quality. A variety of different strategies can be used to assess worker quality. In some examples, the IDLE system 30 performs a qualification test that requires workers to first pass the golden tasks before performing a job. In some examples, the IDLE system 30 performs a hidden test that mixes the golden tasks with regular job questions, and assesses a worker's quality based on the golden tasks after the job is completed. In some examples, a job requester may use either one or both strategies to estimate worker's quality.

The sampling strategy interface 44 enables a job requester to choose among various statistical sampling strategies. The IDLE system 30 includes a general interface for developers to implement the required sampling strategies. The goal is for the job requester to obtain sampling data from a diverse data set. In some examples, the IDLE system 30 includes a number of hierarchical sampling strategies including data clustering followed by stratified sampling, and topic modeling followed by stratified sampling.

The job processing interface 46 enables a job requester to launch jobs of various types (e.g., filter jobs 48, re-label jobs 50, and audit jobs 52).

In a filter job 48, a small set of data are sampled from pre-labeled data and sent to one or more crowdsourcing platforms to confirm their labels. In some examples, filter job questions are presented either as yes/no questions (e.g. "Does the given label match this datum?") or multiple-choice questions (e.g. "Which of the following labels best matches this datum?"). A filter job also may include one or more golden task questions for the purpose of identifying poor-quality workers to exclude from participating in the job. After the workers submit their answers, the results are collected in the answer aggregation component 42 where they are aggregated according to the prescribed technique and the aggregated results are assessed according to one or more consensus criteria, as described above. The results that associated with high confidence levels are used as new training data for the machine learning model 56. The remaining (filtered-out) data are treated as mislabeled data and become input data for re-label jobs that are handled by domain experts, as described above. It is expected that data that are trivial for crowdsourcing workers can quickly pass through and data that are difficult to label are filtered out, hence, the name 'Filter' job. The cost of domain experts is much higher than crowdsourcing workers, which is why it is more cost-effective to have crowdsourcing workforce perform filter jobs on large number of trivial questions first and leave a small number of more challenging re-label jobs to domain experts.

After the data passes through the filter job component 48, the IDLE system 30 automatically collects the filtered-out mislabeled data and makes that mislabeled data available to domain experts for relabeling. As explained above, the domain experts are trained to assign correct labels to the mislabeled data. Thus, data that is relabeled by domain experts do not require quality control or truth inference measures before they become training data for the machine learning model 56. With that said, there might be some data that even domain experts cannot label, these data are regarded as rejected data and recorded for further analysis.

In some examples, after the filter job and the re-label job are completed, all the sampled data are either identified as new training data for the machine learning model or as rejected data for analysis. After retraining the machine learning model 56 in the classification engine with the new training data, the model processes the new training data and updates the product category labels. In some examples, an audit job 52 is performed to assess the accuracy of the retrained machine learning model. Similar to a filter job, a small set of data are sampled and sent to one or more crowdsourcing platforms 36 to identify correctly labeled data. The answer aggregation component 42 is applied to the crowdsourced answers to identify data with high confidence levels and calculate model accuracy while the mislabeled data are simply discarded.

To maximize the effectiveness of crowdsourcing and minimize the costs, the IDLE system 30 includes a data reporter 54 that includes a data visualization dashboard for administrators and analysts to evaluate the effectiveness of crowdsourcing and the performance of the machine learning algorithms. For example, the data reporter 54 enables an analyst to determine the ratio of filter job questions that need to be handled by a re-label job. In some examples, the data reporter 54 includes a crowdsourcing report and a machine learning model report.

The crowdsourcing report provides an evaluation of the effectiveness and the efficiency of crowdsourcing. The crowdsourcing report is designed to provide insights, such as the answer distribution and processing time. The crowdsourcing report includes the statistics and results of crowdsourcing jobs. For filter jobs and audit jobs, the statistics include the ratio of YES vs. NO and job completion time. For re-label jobs, the report displays the ratio of relabeled rate and job completion time. To estimate the overall performance of crowdsourcing for each job, the dashboard also shows the ratio of mislabeled data vs. data with high confidence level in addition to the total processing time.

The machine learning report tracks the rate of improvement for the machine learning model. Thus, the machine learning report shows not only the history of accuracy for the model but also the ratio of data processed through crowdsourcing.

Figure 3:
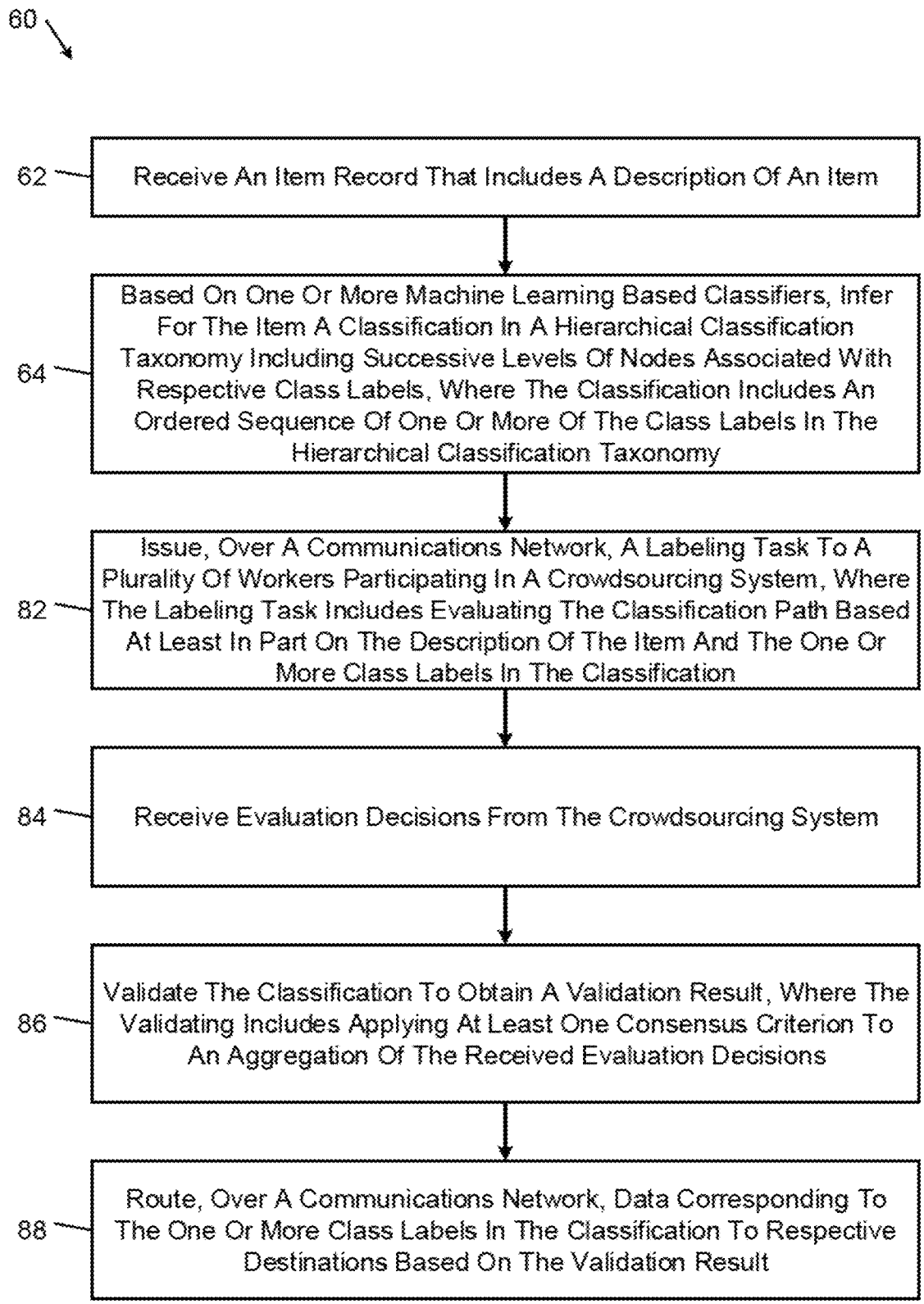
FIG. 3 is a flow diagram of an example process for labeling items.

FIG. 3 is a flow diagram of an example process 60 performed by the IDLE system 30 to label an item with a taxonomic class label. The item may be any type of entity that can be labeled with a taxonomic class label. In some examples, the item corresponds to a product.

In accordance with this process, a training data database component 62 of the IDLE system 30 shown in FIG. 2 receives an item record that includes a description of an item (FIG. 3, block 64). The item record may be received from the job processing component 46 or some other source. In some examples, the item record includes a plurality of attribute-value pairs. Examples of item record attributes (also referred to as data field types) include one or more of merchant name, merchant web address, item description, item name, item quantity, item price, item image, and hyperlink to the item image on the merchant's website.

Based on one or more machine learning based classifiers, the machine learning component 56 of the IDLE system 30 infers for the item a classification path in a hierarchical classification taxonomy that includes successive levels of nodes associated with respective class labels, where the classification includes an ordered sequence of one or more of the class labels in the hierarchical classification taxonomy (FIG. 3, block 64). In some examples, the machine learning component 56 infers the classification from the item description and potentially one or more other attribute values contained in the item record.

Figure 4A:
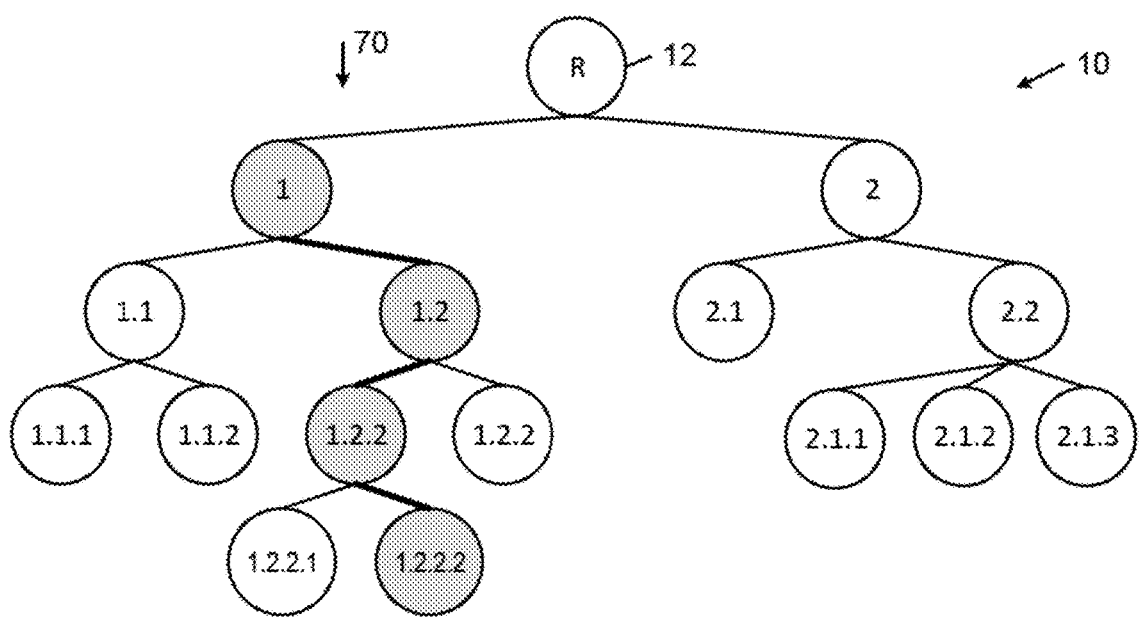
FIG. 4A is a diagrammatic view of an example directed path of nodes in the example taxonomic hierarchy of nodes shown in FIG. 1.

FIG. 4A shows an example structured classification path 70 of non-root nodes in the tree structure of the taxonomic hierarchy 10. The structured classification path 70 of nodes consists of an ordered sequence of the nodes 1, 1.2, 1.2.2, and 1.2.2.2. In this example, each non-root node corresponds to a different respective level in the taxonomic hierarchy 10.

Figure 4B:
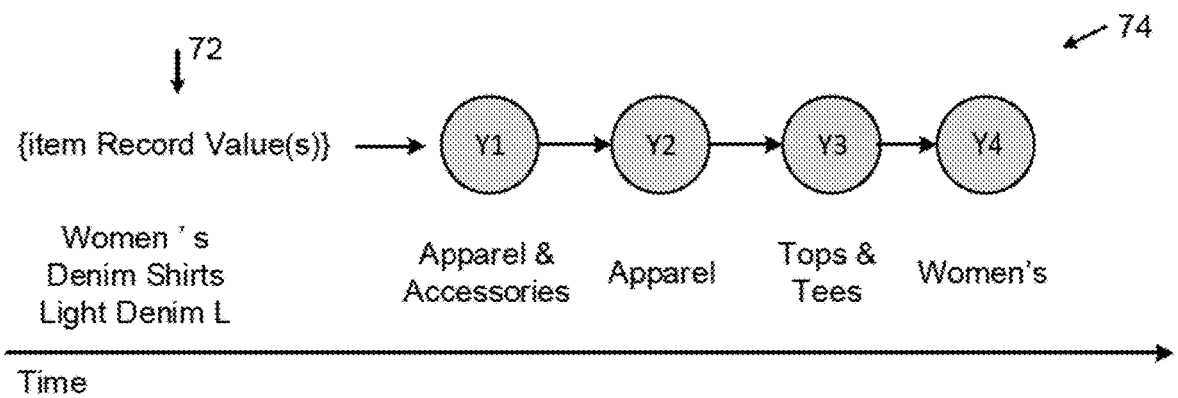
FIG. 4B shows a sequence of inputs corresponding to an item description being mapped to a sequence of output classes corresponding to nodes in the example classification path shown in FIG. 4A.

Referring to FIG. 4B, in some examples, the machine learning component 56 performs hierarchical classification (using, e.g., a Naïve Bayes machine learning model) on one or more item record values 72 (e.g., product description), from the root of the hierarchical taxonomy level-by-level to the leaf level, to produce a sequence 74 of outputs {Y1, Y2, . . . , Y4} corresponding to infer the sequence of nodes in the structured hierarchical classification path 70. In this example, the sequence 72 of inputs corresponds to a description of a product (i.e., "Women's Denim Shirts Light Denim L") and the taxonomic hierarchy 10 defines a hierarchical product classification system. In the illustrated example, the hierarchical classification system 30 has transduced the input item record value(s) into the directed hierarchical sequence of output node class labels ("Apparel & Accessories", "Apparel", "Tops & Tees", and "Women's"). In other examples, the machine learning component 56 predicts the leaf node category and infers the structured classification path 70 based on the taxonomic hierarchy 10.

Figure 5:
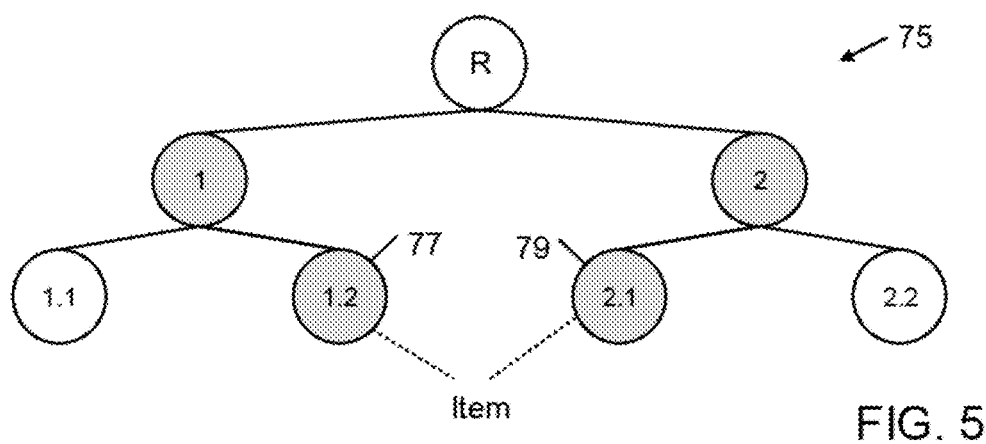
FIG. 5 is a diagrammatic view of an example taxonomic hierarchy of nodes.

In addition to inferring a single discrete classification path through a hierarchical classification structure for each item record, examples of the machine learning component 56 also can be trained to classify an item based on one or more record values 72 associated with the item (e.g., product description) into multiple paths in a hierarchical classification structure (i.e., a multi-label classification). For example, FIG. 5 shows an example in which the item is mapped to two nodes 77, 79 that correspond to different classes and two different paths in a taxonomic hierarchy structure 75. Techniques similar to those described above can be used to train the machine learning component 56 to generate an output classification that captures all the class labels associated with an input.

Referring back to FIG. 2, in the illustrated example, after inferring the classification in the hierarchical taxonomy for the item (FIG. 3, block 64), the machine learning component 56 loads a data record that includes the inferred classification and one or more of the item record values 72 as pre-labeled data in a database 80. In some examples, a job requester uses the sampling strategy interface 44 to create a filter job. In this process, the job requester selects a sampling strategy and a sample count for the filter job. The job requester also configures parameters of the crowdsourcing task, e.g., reward per assignment and number of assignments per HIT (Human Intelligence Task). In some examples, the job requester is able to tailor the presentation of the classification to crowdsourcing workers. For example, the job requester may choose to only present a portion of the levels in the inferred classification, such as one or more nodes in the upper, lower, or middle portions of the classification taxonomy. In other examples, the job requester may elect to present a modified version of the classification in which multiple nodes are combined into a single node (e.g., by combine successive nodes into a single node) in the classification that is presented to the workers. To estimate worker's quality, the system can also be configured to automatically include golden tasks (e.g., quality control questions) in the job. In some example, configurations of a crowdsourcing job are reviewed and confirmed prior to job creation.

Referring back to FIG. 3, after the crowdsourcing job has been confirmed, the job processing component 46 of the IDLE system 30 issues, over a communications network, a labeling task to a plurality of workers participating in a crowdsourcing system, where the labeling task includes evaluating the presented classification based at least in part on the description of the item and the class labels in the presented classification path (FIG. 3, block 82). In some examples, a labeling task involves confirming the classification based at least in part on the description of the item and an ordered sequence of the class labels in the classification.

In some of theses examples, the confirming of the classification is additionally based on results of an online search query that includes the description of the item. In some examples, the item record includes a merchant associated with the item, and the confirming of the classification path is additionally based on the merchant. In some examples, the item record includes a price associated with the item, and the confirming of the presented classification path is additionally based on the price.

In some examples, the IDLE system 30 issues an interface specification for presenting the labeling task on workers' respective computing devices and receiving workers' responses to the labeling task (e.g., validation or invalidation responses).

After publishing a job to one or more crowdsourcing platforms 36, the job processing component 46 of the IDLE system 30 receives evaluation decisions from the one or more crowdsourcing systems (FIG. 3, block 84). The types of evaluation decisions received depend of the labeling task posted to the crowdsourcing system. In some examples, a filter job includes a labeling task to respond to a question presented as a yes or no question (e.g., "Does the given label match this datum?"). In some examples, a filter job includes a labeling task to respond to a question presented as a multiple-choice question (e.g., "Which is the following labels best matches this datum?"). In some examples, a filter job includes a labeling task to provide a substitute classification for an item.

After receiving the evaluation decisions for the crowdsourcing job, the job processing component 46 validates the classification to obtain a validation result, where the validating comprises applying at least one consensus criterion to an aggregation of the received evaluation decisions (FIG. 3, block 86). In some examples, the job processing component 46 of the IDLE system 30 automatically performs answer aggregation upon receiving the evaluation decisions from the crowdsourcing workers. A wide variety of different answer aggregation algorithms made be used to obtain a validation result, including any of the consensus approaches described above.

In some examples, the validation result may be one of the following: a valid classification, an invalid classification, and an uncertain classification. In some examples, the validating includes, responsive to failure to satisfy at first consensus criterion, issuing the labeling task to at least one additional worker participating in the crowdsourcing system and receiving a respective evaluation decision from the at least one additional worker. In these examples, a second consensus criterion is applied to an aggregation of the received evaluation decisions including the evaluation decision received from the at least one additional worker. As mentioned above, in some examples, more than two consecutive consensus criteria are applied to the workers' evaluation decisions received for the crowdsourcing job.

After validating the classification, the job processing component 46 of the IDLE system 30 routes, over a communications network, data corresponding to the one or more class labels in the classification to respective destinations based on the validation result (FIG. 3, block 88). In some examples, responsive to a validation of the classification path, one or more of the class labels in the classification path are designated as training data for one or more of the machine learning based classifiers and routed to a training data database. In some examples, responsive to an invalidation of the classification path, the labeling task is routed over a communications network to at least one domain expert for relabeling. After receiving from the at least one domain expert a relabeled version of one or more of the class labels in the classification path, the relabeled version of the one or more class labels in the classification path are designated as training data for one or more of the machine learning based classifiers and routed to a training data database.

Figure 6:
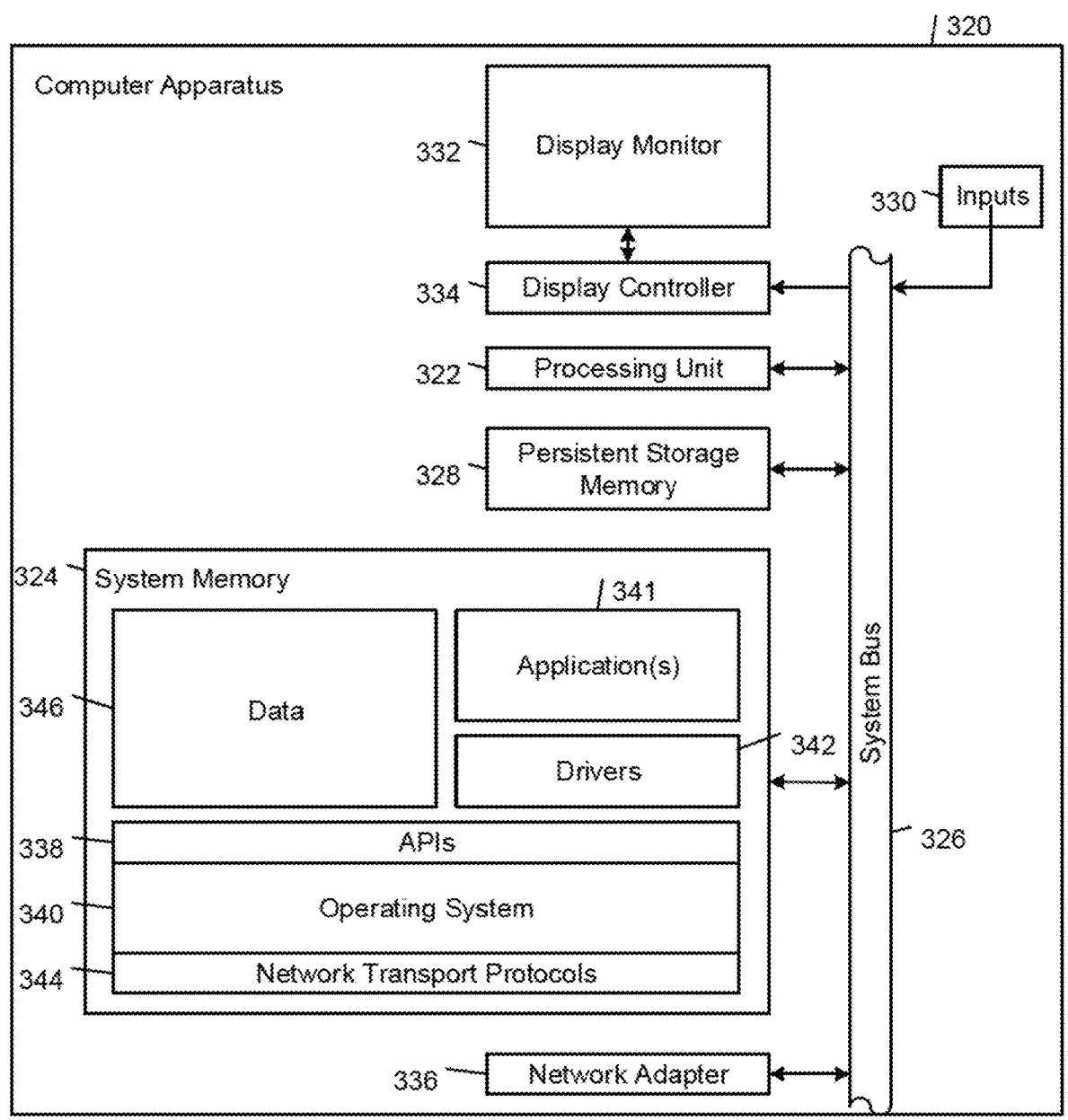
FIG. 6 is a block diagram of an example computer apparatus

FIG. 6 shows an example embodiment of computer apparatus that is configured to implement one or more of the hierarchical item classification systems described in this specification. The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the hierarchical classification systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A computer-implemented method of labeling items, comprising:
    receiving item records, each of the item records including a respective description of an item;
    based on a machine learning model, inferring, for each item, a classification in a hierarchical classification taxonomy, the hierarchical classification taxonomy including successive levels of nodes associated with respective class labels, wherein the classifications include one or more of the class labels in the hierarchical classification taxonomy;
    issuing, over a communications network, a first job that includes a first labeling task to workers participating in at least one crowdsourcing system, wherein the first labeling task includes evaluating a first classification of the classifications based at least in part on a respective description of a first item and a respective one or more of the class labels in the first classification;
    receiving evaluation decisions from the at least one crowdsourcing system corresponding to the first labeling task;
    aggregating the evaluation decisions corresponding to the first labeling task received from the at least one crowdsourcing system;
    generating a validation result of the first classification by applying a first consensus criterion to the aggregation of the evaluation decisions;
    routing, over the communications network, data corresponding to one or more of the respective class labels in the first classification to respective destinations based on the validation result;
    generating a first report corresponding the first job, the first report including a processing time for the first job and a first ratio corresponding to the first labeling task; and
    generating a second report corresponding to the machine learning model, the second report including current and historical accuracies of the machine learning model and a second ratio corresponding to data used to train the machine learning model that has been processed by the at least one crowdsourcing system.

2. The method of claim 1, wherein the inferring is based on a respective item record.

3. The method of claim 1, wherein the first classification includes a classification path corresponding to an ordered sequence of respective ones of the class labels in successive levels of the hierarchical classification taxonomy.

4. The method of claim 3, wherein the first labeling task includes confirming the classification path based at least in part on the respective description of the first item and the ordered sequence of the class labels in the classification path.

5. The method of claim 4, wherein the confirming of the classification path is additionally based on results of an online search query including the respective description of the first item.

6. The method of claim 4, wherein the respective item record includes a merchant associated with the first item, and the confirming of the classification path is additionally based on the merchant.

7. The method of claim 4, wherein the respective item record includes a price associated with the first item, and the confirming of the classification path is additionally based on the price.

8. The method of claim 1, wherein the aggregation of the evaluation decisions is a first aggregation, and wherein:
    the generating of the validation result includes, responsive to a failure to satisfy the first consensus criterion, issuing the first labeling task to at least one additional worker participating in the at least one crowdsourcing system, and receiving a respective evaluation decision from the at least one additional worker; and
    the applying includes applying a second consensus criterion to a second aggregation of the evaluation decisions, the second aggregation including the first aggregation of the evaluation decisions and the respective evaluation decision from the at least one additional worker.

9. The method of claim 1, wherein, responsive to a validation of the first classification, the method further includes designating the more of the respective class labels in the first classification as training data for one of the machine learning model; and wherein the routing of the data includes routing the one or more of the respective class labels in the first classification to a training data database.

10. The method of claim 1, wherein, responsive to an invalidation of the first classification, the method further includes:
    issuing a second job that includes a second labeling task over a communications network to at least one domain expert for relabeling, the relabeling including evaluation the first classification;
    receiving the evaluation of the first classification; and
    at least one of (a) routing a re-labeled version of the first classification to a training data database or (b) marking the first classification as rejected based on the evaluation.

11. The method of claim 1, further including filtering out duplicate tasks prior to the issuing.

12. The method of claim 1, wherein the first classification extends from a first level in the hierarchical classification taxonomy to a second level in the hierarchical classification taxonomy.

13. The method of claim 12, wherein the second level in the hierarchical classification taxonomy corresponds to a leaf node level in the hierarchical classification taxonomy.

14. The method of claim 13, wherein the first classification extends through successive levels in the hierarchical classification taxonomy but terminates prior to the leaf node level.

15. The method of claim 1, wherein the first consensus criterion includes at least one of majority voting, weighted majority voting, or Bayesian voting.

16. The method of claim 1, wherein the first labeling task includes at least one question having a ground truth answer, the at least one question indicative of a quality of respective ones of the evaluation decisions, the method further including, responsive to a failure to correctly answer the at least one question, excluding a respective worker from evaluating the first classification.

17. The method of claim 1, wherein the first job further includes a second labeling task corresponding to a second classification of the classifications; and
wherein the at least one first ratio of the first report corresponds to the first labeling task and the second labeling task.

18. The method of claim 1, wherein the validation result is indicative of a confidence value for the first classification as inferred by the machine learning model.

19. A computer-readable data storage device, excluding propagating signals, comprising instructions to cause processor circuitry to at least:
infer for an item a classification in a hierarchical classification taxonomy, the hierarchical classification taxonomy including successive levels of nodes associated with respective class labels, the classification based on a machine learning based classifier, wherein the classification includes one or more of the class labels in the hierarchical classification taxonomy;
issue, over a communications network, a first job that includes a labeling task to a plurality of workers participating in one or more crowdsourcing systems, wherein the labeling task includes evaluating the classification based at least in part on a description of the item and the one or more of the class labels in the classification;
receive a evaluation decisions corresponding to the labeling task from the one or more crowdsourcing systems;
aggregate the evaluation decisions corresponding to the labeling task; and
generate a validation result corresponding to the classification by applying a first consensus criterion to the aggregation of the received evaluation decisions;
route, over the communications network, data corresponding to one or more of the respective class labels in the classification to respective destinations based on the validation result;
generate a first report corresponding to the first job, the first report including processing time for the first job and at least one first ratio corresponding to the labeling task; and
generate a second report corresponding to the machine learning based classifier, the second report including current and historical accuracies of the machine learning based classifier and a second ratio based on data used to train the machine learning based classifier that has been processed by the one or more crowdsourcing systems.

20. The computer-readable data storage device of claim 19, wherein the classification includes a classification path corresponding to an ordered sequence of respective ones of the class labels in successive levels of the hierarchical classification taxonomy.

21. The computer-readable data storage device of claim 19, wherein the first consensus criterion includes at least one of majority voting, weighted majority voting, or Bayesian voting.

22. The computer-readable data storage device of claim 19, wherein the labeling task includes a qualification task, the qualification task including at least one question having a ground truth answer, and wherein the instructions are to cause the processor circuitry to end a respective labeling task in response to a failure to correctly answer the at least one question having the ground truth answer.

23. A system, comprising
communication circuitry to:
issue, over a communications network, a first job that includes a labeling task to a plurality of workers participating in a crowdsourcing system, wherein the labeling task includes evaluating a classification of an item inferred by a machine learning model, the classification including an ordered sequence of respective class labels in successive levels of a hierarchical classification taxonomy, the evaluation based at least in part on a description of the item and the class labels in the classification; and
receive evaluation decisions from the crowdsourcing system, the evaluation decisions corresponding to the labeling task; and
processor circuitry to:
aggregate the evaluation decision corresponding to the labeling task;
generate a validation result for the classification by applying at least one consensus criterion to an aggregation of the received evaluation decisions;
route, over the communications network, data corresponding to one or more of the class labels in the classification to respective destinations based on the validation result; and
generate a first data report for the first job, the first data report including processing time for the first job and at least one first ratio corresponding to the labeling task; and
generate a second data report corresponding to performance of the machine learning model, the second data report including current and historical accuracies of the machine learning model and a second ratio of data used to train the machine learning model that has been processed by the crowdsourcing system.

24. The system of claim 23, wherein, responsive to an invalidation of the classification:
the communication circuitry is to:
issue, over the communications network, a second job that includes the labeling task to at least one domain expert for relabeling, the relabeling to include a relabeling of one or more of the class labels in the classification; and
receive the relabeled one or more of the class labels in the classification; and
the processor circuitry is to:
designate the relabeled the classification as training data; and
route the relabeled the classification to a training data database.

25. The system of claim 23, wherein the at least one consensus criterion includes at least one of majority voting, weighted majority voting, or Bayesian voting.

26. The system of claim 23, wherein, prior to evaluating the classification, the labeling task includes at least one qualification question having a ground truth answer, and wherein, in response to a failure to correctly answer the qualification question, the processor circuitry is to end the labeling task for a respective worker of the plurality of workers participating in the crowdsourcing system.

* * * * *

UNITED STATES PATENT AND TRADEMARK OFFICE
CERTIFICATE OF CORRECTION

PATENT NO. : 11,803,883 B2
APPLICATION NO. : 16/243342
DATED : October 31, 2023
INVENTOR(S) : Wu et al.

It is certified that error appears in the above-identified patent and that said Letters Patent is hereby corrected as shown below:

In the Claims

Column 12, Claim 9, Line 36, delete "the more of the respective class labels," and insert --the one or more of the respective class labels--.

Column 12, Claim 9, Line 37, delete "one of".

Column 13, Claim 19, Line 37, delete "receive a evaluation" and insert --receive evaluation--.

Signed and Sealed this
Twelfth Day of March, 2024

Katherine Kelly Vidal
*Director of the United States Patent and Trademark Office*